United States Patent Office 3,137,737
Patented June 16, 1964

3,137,737
TELOMERIZATION OF UNSATURATED HYDRO-
CARBONS WITH POLYOXYALKYLENE COM-
POUNDS AND TELOMERIC PRODUCTS AND
SYNTHETIC LUBRICANTS OBTAINED THEREBY
Donald D. Emrick, Shaker Heights, Samuel M. Darling,
Lyndhurst, and Edwin O. Hook, Chagrin Falls, Ohio,
assignors to The Standard Oil Company, Cleveland,
Ohio, a corporation of Ohio
No Drawing. Filed Sept. 4, 1959, Ser. No. 838,044
1 Claim. (Cl. 260—611)

This invention relates to a process for the telomerization of low molecular weight α-olefins with polyoxyalkylene compounds, and more particularly to the telomerization of α-olefins such as ethylene with polyoxyalkylene compounds in the presence of a free radical initiator, and to the free-flowing liquid telomers thereby obtained, which have properties adapting them for use as synthetic lubricants alone and in blends with mineral lubricating oils.

In recent years, a number of synthetic (i.e., not petroleum-derived) lubricants have been made available to meet special needs in the field of lubrication. Such lubricants have considerably improved properties, as compared to mineral lubricating oils derived from petroleum, and these properties have made it quite clear that such synthetic lubricants will continue to find a wide field of utility in those applications where petroleum-derived lubricants have not proved completely satisfactory. Polyoxypropylene glycols, polyoxyethylene glycols, and mixed polyoxyalkylene glycols prepared from mixtures of ethylene oxide and propylene oxide, as well as monoalkyl and dialkyl ethers thereof, have been well accepted commercially as synthetic lubricants. Such materials are being marketed in large volume under the trade name "Ucon."

The polyoxyalkylene glycol-derived oils have, in general, higher viscosity indices than petroleum lubricants, as compared to petroleum oils of similar viscosity, and they also have a lower A.P.I. gravity (higher density) and a lower pour point. Because of their high oxygen content, they can be pyrolyzed with little or no carbon residue, and they also have a high solvent capacity for the resins, gums, sludges and varnishes which are formed in internal combustion engines by oxidative decomposition of petroleum products.

However, these oxygenated materials have, in general, the great disadvantage of only a very limited solubility in petroleum-base lubricants. A few diethers of lower polyoxyalkylene glycols of improved solubility have been made available, but these are more volatile than the corresponding glycols. Polyoxyalkyene glycols derived from the higher alkylene oxides such as polyoxybutylene glycols have a better oil solubility than the polyoxyethylene and polyoxypropylene glycols, but of these only the polyoxybutylene glycols have been made available, and then at a price premium over the more common lower glycols. They have not met the need for a synthetic lubricant of this type which would have a considerable solubility in petroleum lubricants.

Olefins undergo a reaction known as telomerization which has been described in numerous patents and publications. Large amounts of ethylene and propylene are available from petroleum refinery gases, or are made readily on cracking hydrocarbons. These constitute a good source of cheap raw material for making new products, such as telomers.

Telomerization involves the reaction of the olefin, called a taxogen, with a fragment of another molecule, known as a telogen, and the product of this reaction is called a telomer. The reaction can be defined by the following equation:

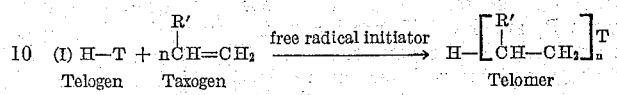

$R'$ is a hydrogen or an alkyl, aryl, mixed alkyl aryl, mixed aryl alkyl, or cycloalkyl radical.

Telomers are different from copolymers and interpolymers. Copolymers and interpolymers contain a number of each of two or more different monomer units in the main polymer chain, whereas the fragments of another molecule (the telogen) in telomers appear as units at the terminal of the main polymer chain. Telomerization differs from simple free radical addition to the double bond of an olefin in that more than one molecule of the olefin appears in the product. The telomerization reaction proceeds in the presence of a free radical initiator which removes an active hydrogen from the telogen. The resulting radical initiates the telomerization by adding to the double bond of the olefin.

In the process of the invention, improved synthetic lubricants and lubricant blending agents are provided by telomerizing an α-olefin taxogen with a polyoxyalkylene compound telogen in the presence of a free radical initiator for the telomerization. The product is a free-flowing liquid olefin telomer having a molecular weight below 10,000, and preferably below 2,000, containing oxyalkylene units attached to a polymeric olefin-derived hydrocarbon unit.

The preferred telomeric products of the invention are viscous liquids or oils having a viscosity of not over 2000 SSU at 100° F., and preferably not over 1000 SSU at 100° F. (approximately an SAE No. 50 lubricating oil).

These telomers are intended to be used as a lubricant per se, or as a lubricant base for a lubricating oil in blends with other lubricants, or with lubricant additives. In such blends, they function as lubricants, and do not act as viscosity index improvers, or pour point improvers, nor do they have surface active properties. In short, they are lubricants, and not lubricant additives.

They can be prepared to be compatible with mineral oil at a rather high level of solubility, or to be relatively insoluble in mineral oil, depending upon the proportion of carbon to oxygen, i.e., of oxyalkylene units to polyolefinic hydrocarbon units, in the molecule. In many cases, the solubility of the telomer in the oil decreases with decreasing concentration in the oil; this is the result of the material being a better solvent for the mineral oil than the mineral oil is for the telomer.

The telogen is a polyoxyalkylene compound having at least one tertiary hydrogen on a carbon atom adjacent to an ether oxygen atom, and can be defined by the following general formula:

(II)

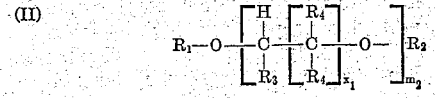

where $R_1$ and $R_2$ are hydrogen or alkyl, aryl, mixed aryl alkyl, mixed alkyl aryl, or cycloalkyl radicals having from one to twenty-four carbon atoms, $R_3$, $R_4$ and $R_5$ are hydrogen or alkyl, aryl, mixed aryl alkyl, mixed alkyl aryl or cycloalkyl radicals having from one to eight carbon atoms, $x_1$ is the number of

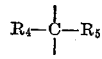

units in the oxyalkylene unit, and ranges from 0 to 10, and $m_2$ is a number representing the number of repeating oxyalkylene units in the chain, and ranges from about 10 to several thousand, usually not over 10,000, and preferably below 5,000. It will be understood that the repeating oxyalkylene units can be complex mixtures of such units, such mixtures being obtainable from mixtures of alkylene oxides.

These compounds are polyoxyalkylene glycols, or mono- or diethers of polyoxyalkylene glycols, depending upon $R_1$ and $R_2$. All are inclusively referred to herein as polyoxyalkylene compounds, for simplicity of terminology, and the residues thereof in the telomer are referred to as polyoxyalkylene units, whether glycols, monoglycol ethers or diethers.

Typical $R_3$, $R_4$ and $R_5$ radicals are methyl, ethyl, n-propyl, isopropyl, n-butyl, isobutyl, secondary butyl, tertiary butyl, n-amyl, isoamyl, tertiary amyl, n-hexyl, isohexyl, phenyl, xylyl, benzyl, β-phenylethyl, α-phenylethyl, tolyl, ethylphenyl, cyclohexyl, methylcyclohexyl, cyclopentyl and cycloheptyl.

$R_1$ and $R_2$ can be any of the above and, in addition, 2-ethylhexyl, n-heptyl, tert-heptyl, n-octyl, isooctyl, tert-octyl, n-nonyl, tert-nonyl, n-decyl, and tert-decyl.

Typical aliphatic

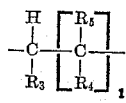

radicals are ethylene, 1,2-propylene, 1,3-propylene, 1,2-butylene, 1,3-butylene, 1,4-butylene, 2,3-butylene, 1,2-amylene, 1,3-amylene, 1,4-amylene, 1,5-amylene, 2,3-amylene, 2,4-amylene, 1,2-hexylene, 1,2-octylene, 3,4-octylene, 1,8-octylene and 1,2-heptylene.

Mixed aliphatic aromatic radicals and aliphatic cycloaliphatic radicals analogous to these will be obtained by substituting aryl and cycloalkyl and mixed alkyl aryl and aryl alkyl radicals for hydrogen in any of these radicals.

As exemplary of polyoxyalkylene compound telogens there can be mentioned polyoxyethylene glycols, polyoxy-1,2-propylene glycols, monomethyl ether of polyoxy-1,2-propylene glycol, diethyl ether of polyoxy-1,2-propylene glycol, dimethyl ether of polyoxy-1,2-propylene glycol, polyoxy-1,2-butylene glycols, polyoxy-2,3-butylene glycols, monobutylene-polyoxy-1,2-propylene glycol, monobutyl ether of polyoxy-1,3-propylene glycol, monoethyl ether of polyoxy-1,2-propylene glycol, and the monobutyl ether of polyoxyethylene-oxy-1,3-propylene (1:1) glycol.

The higher molecular weight polyoxyalkylene compounds tend to produce viscous products. As the molecular weight of the alkylene unit increases, however, the pour point of the telomer is reduced, and the polyoxypropylene and higher alkylene compounds tend to produce more fluid telomers of better pour point.

The taxogen is an unsaturated hydrocarbon having the general formula:

(III)      $R'CH=CH_2$ $R'$ is hydrogen or an aliphatic, aromatic or cycloaliphatic radical having from one to sixteen carbon atoms. These are referred to for convenience herein as α-olefins.

Typical $R'$ radicals are phenyl, methyl, ethyl, isobutyl, n-hexyl, n-amyl, n-butyl, n-propyl, isopropyl, cyclohexyl, cyclopentyl, benzyl, tolyl, xylyl, phenethyl, ethyl phenyl, n-decyl, n-dodecyl, n-tetradecyl, and methyl cyclohexyl.

These polyoxyalkylene compound telogens are believed to react with the α-olefin taxogens according to the following equation:

(IV)

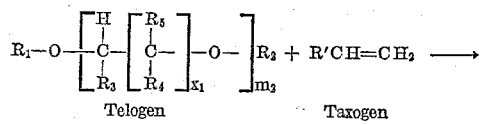

Telogen      Taxogen (A)   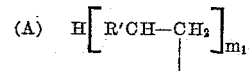

(B)   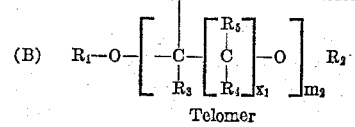

Telomer

In the above equation, $R_1$, $R_2$, $R_3$, $R_4$, $R_5$, $x_1$, and $m_2$ are as in II, above, and $R'$ is as in III, above. $m_1$ is the number of moles of the olefin in the polyolefin hydrocarbon unit A, and $m_2$ is the number of moles of the oxyalkylene unit B, in the telomer molecule.

The ratio $m_1/m_2$ determines mineral oil solubility. Generally speaking, the lower the ratio, the lower the solubility in mineral oil, and vice versa. Oil solubility also can be regarded as determined by the ratio of carbon to oxygen in the molecule, which, as is apparent, is merely another way of expressing the ratio $m_1/m_2$.

The above reaction mechanism has been tentatively confirmed by infrared analysis of the telomeric product. When the polyoxyalkylene compound contains two or more tertiary hydrocarbon reactive sites, the telomerization may occur at any or all such sites, depending upon the reaction conditions, and the amounts and kinds of olefin and free radical initiator available for the telomerization.

The taxogen used to produce an oil preferably is a mixture of ethylene with other α-olefins containing at least 50 mole percent (50% of total moles) but not over 90 mole percent of ethylene. α-Olefins higher than ethylene in molecular weight can be used alone, but react more slowly and produce lower conversions and yields than mixtures thereof with ethylene.

The telomers obtained using ethylene alone or in amounts of more than 90 mole percent contain as the principal reaction product large quantities of high molecular weight, high melting solid materials, which are not desired, and are outside of the scope of the invention.

Telomers composed partially or wholly of higher olefins, such as butene-1, pentene-1, 4-methyl pentene-1, 3-methyl hexene-1, hexene-1, heptene-1, octene-1, decene-1, styrene and 8-p-menthene, are of lower molecular weight and lower melting point, and are liquids. The α-olefins higher than ethylene react more slowly, and less completely, than does ethylene. The larger the amount of branching, the less the reactivity, also. These factors contribute to the formation of an oil.

In each instance, the inclusion of even a small amount of higher olefin modifies the nature of the reaction product by lowering the melting or pour point. Thus, by appropriate adjustment of the proportion of a mixture of ethylene and higher α-olefin, and the particular higher α-olefin, it is possible to prepare a wide variety of liquid products, ranging from light fluids to highly viscous oils.

In many cases, cleavage of the polyoxyalkylene compound may occur at the ether oxygen, and such telomeric products include as a part of their molecule polyoxyalkylene groups having a lower average molecular weight than the starting compound. Some telomeric products have a lower molecular weight than the starting compound, despite the fact that the olefin has reacted with it. This is used to advantage in producing a final liquid product of low molecular weight, from a high molecular weight polyoxyalkylene compound.

The ratio of carbon to oxygen in the telomer determines the solubility in petroleum-derived oils. Generally, the higher the ratio, the more soluble in the oil. The extent of branching and the molecular weight determines its melting or pour point.

Telomers obtained from ethylene with only a small proportion, below about 50 mole percent (50% of total moles of olefin), of a higher α-olefin are generally miscible with solvent-extracted neutral oil stocks at all levels of concentration. In this case, the telomeric products are more hydrocarbon-like because a large proportion of ethylene units react with the oxyalkylene units of the polyoxyalkylene compound, and $m_1/m_2$ is higher; this, of course, increases the compatibility with mineral lubricating oil. The chain modification caused by the incorporation of the higher α-olefin is such as to keep the pour point low enough for practical use as a lubricant, and prevent the production of a solid or waxy product, as would be the case with pure ethylene alone.

Products from polyoxy-1,2-propylene glycol and olefins containing a ratio of $m_1/m_2$ which is relatively high (0.55 or more for olefins comprising at least 50% ethylene) are generally completely soluble in mineral lubricating oils. As this ratio is decreased, the products have more limited solubility in mineral lubricating oils and as the ratio becomes relatively low, for example, about 0.3, the products are insoluble in mineral lubricating oils. Such products correspond to polyethers containing more than 67 weight percent of combined carbon, or a carbon to oxygen ratio of greater than 3.08 to 1. A similar gradation in solubility with the ratio $m_1/m_2$ is observed for other polyoxyalkylene compounds, but of course the ratios at which the limits of oil solubility are reached differ.

The reaction requires a free radical initiator, and this substance can be any of those well known to those skilled in the art as useful in the telomerization of ethylene. It should be sufficiently active to decompose freely into free radicals under the reaction conditions which can be employed. Initiators which lead to excessive cleavage of the polyoxyalkylene compound under the reaction conditions should, however, be avoided.

An initiator is required which is capable of depriving the telogen of its active hydrogen, and starting the series of reactions which leads to the telomer. The energy required to remove this hydrogen is apparently higher than that needed in adding a free radical across the carbon-to-carbon double bond of the olefin. Free radicals are required which are active at the temperatures permissible in telomerization reactions. Furthermore, the telomerization reaction chain is easily interrupted and the reaction halted by conventional free radical inhibitors, and the reactants should be relatively free from such inhibitors.

Initiators which may be used include diacyl peroxides such as diacetyl peroxide, dipropionyl peroxide, dibutyryl peroxide, and dilauroyl peroxide, dialkyl peroxides such as di-tert-butyl peroxide, dihexyl peroxide, di-isopropyl peroxide, di-isobutyl peroxide, di-2-ethylhexyl peroxide, di-n-butyl peroxide, and diethyl peroxide; terpene peroxides, dicycloaliphatic peroxides such as dicyclohexyl peroxide; perhalogen compounds such as hexachloroethane, and combinations thereof with dialkyl peroxides, organometallic compounds such as tetraethyl lead, tetraphenyl lead, and azo-N=N-compounds such as azobis(isobutyronitrile) and diazoaminobenzene.

Di-tert-butyl peroxide is a preferred free radical initiator for use in this invention, because it shows a minimum tendency toward ether cleavage under most reaction conditions.

The stability of free radical initiators is customarily evaluated in terms of half-life at a stated temperature, and the following table compares this for several commercially available free radical initiators.

TABLE I

| Compound | Temp. (° C.) | Half Life (Hours) | No. Moles of Radical Produced Per Pound |
|---|---|---|---|
| 1. Tetraethyl Lead | | | 5.62 |
| 2. Lauroyl Peroxide | 50 | 54.2 | |
| | 70 | 3.4 | 2.27 |
| | 85 | 0.5 | |
| 3. Dicumyl Peroxide | 115 | 12.4 | |
| | 130 | 1.8 | 3.34 |
| | 145 | 0.38 | |
| 4. Di-t-butyl Peroxide | 100 | 218 | |
| | 115 | 34 | |
| | 130 | 6.4 | 6.20 |
| | 145 | 1.4 | |
| | 160 | 0.24 | |
| 5. Benzoyl Peroxide | 70 | 13.0 | |
| | 85 | 2.15 | 3.74 |
| | 100 | 0.40 | |
| 6. 2,4-Dichlorobenzoyl Peroxide | 50 | 17.8 | |
| | 70 | 1.41 | 2.38 |
| | 85 | 0.25 | |
| 7. Azobis(isobutyronitrile) | 80 | 1.26 | 5.50 |

In general, the half-life of the free radical initiator employed at the reaction temperature should be within the range from about 0.25 to about 10 hours, since such initiators have been found to give the best results. By suitable modification of the reaction conditions, however, it is possible to employ free radical initiators whose half-life is outside of this range.

The reaction conditions can be widely varied. The conditions should be such that excessive ether cleavage does not occur. The preferred reaction temperature is established by the temperature at which the free radical initiator decomposes to give a rapid liberation of a substantial amount of free radicals within the above-stated range for half-life. For di-tertiary-butyl peroxide, for example, the table shows that the preferred reaction temperatures are within the range from 125 to 160° C. At reaction temperatures below this, because of the slower evolution of free radicals, the reaction time tends to be quite long. Higher temperatures may be wasteful, since the free radical initiator may be decomposed at a higher rate than can be utilized in the telomerization, so that the free radicals will be lost and therefore wasted. In general, for heat-decomposable free radical initiators, reaction temperatures within the range from 40 to 200° C. are useful.

If the boiling point of the unsaturated hydrocarbon is low, it is necessary to operate under pressure.

If the free radical initiator is decomposable by radiation, such as by ultraviolet rays, such radiation can be used, and it may then be unnecessary to heat the reaction mixture above room temperature. Azobis(cyclohexane nitrile) and azobis(isobutyronitrile) are initiators of this type, and in fact the latter initiator could be used to carry out a telomerization at temperatures below 0° C.

If the reactants are liquids at the reaction temperature, no solvent is necessary unless dilution is desired to maintain control of the reaction rate. However, a solvent for the unsaturated hydrocarbon will assist in bringing it into contact with the telogen, and it may be possible because of this facilitation of the reaction to use less olefin in the reaction mixture. A solvent also may be desirable when the telogen is a solid in order to increase the reaction rate.

The solvent should be inert under the telomerization reaction conditions. Suitable solvents include benzene, cyclohexane, n-octane and iso-octane. Preferably, the reaction mixture is agitated.

The reaction initially is exothermic and requires careful control to prevent the temperature from rising so high that free radical initiator decomposition becomes too rapid. As the reaction proceeds, less heat is liberated, and eventually it becomes necessary to heat the reaction mixture in order to bring the reaction to completion.

The reaction time will depend upon the initiator and the reactants, the concentrations thereof, and the reaction temperature. It is usually convenient to employ reaction conditions such that the reaction can be complete in less than ten hours, but of course, this is a matter of choice, and reaction times as long as thirteen to fifty hours may not be out of line, depending upon the need.

A high olefin concentration will yield a higher molecular weight product than will a lower olefin concentration. A lower temperature has the same effect. At any given pressure level, the average molecular weight of the product may be increased by operating at the minimum temperature permitted by the decomposition temperature of the free radical initiator, so as to obtain a slow evolution of free radicals, but such reactions will require a long time to complete. The same effect may be obtainable by incorporating an inert diluent which is a good solvent for the unsaturated hydrocarbon.

The reaction is easily carried out in conventional pressure equipment. The reactants are introduced in any convenient order, and the equipment brought to the reaction conditions desired.

The ingredients may be brought together in any order but preferably, the polyoxyalkylene compound, the unsaturated hydrocarbon, and the solvent, if one is employed, are first mixed together and the free radical initiator is then added incrementally. If the unsaturated hydrocarbon is a gas such as ethylene, the reaction vessel may be run at a constant olefin gas pressure throughout the reaction during the addition of the free radical initiator. In this manner, greater telogen conversions may be obtained together with the production of telomers of a more uniform average molecular weight distribution.

Usually, successful reactions are noticeably exothermic in the early stages of reaction and cooling is often necessary to control the reaction, especially during this early phase of the reaction. The course of reaction is followed from a drop in olefin pressure; if an initial pressure of 850 p.s.i.g. at 20° C. of ethylene-rich olefin is used, the pressure during a successful reaction will frequently be decreased to 25 to 50% of its initial value during the course of the reaction. The final reaction product is stripped of volatiles by treating the warm product with a stream of air at 90–100° C. Alternately, the product may be stripped of volatiles under a vacuum. The stripped product is then cooled to 0–20° C. and, if necessary, treated with Fuller's earth or preferably Bentonite clay in order to remove the small quantity of wax usually present.

A continuous reaction is of particular interest in a commercial process. This is readily effected by suitable equipment which permits continuous blending of the polyoxyalkylene compound with the olefin and free radical initiators, holding them in a pressurized reaction chamber in which they have a dwell time equivalent to that required to complete the reaction, and then drawing them off to a working-up chamber where the solvent is removed and the residue recovered.

Telomer products are obtainable having a wide range of molecular weights which vary according to the reactants, reaction conditions and concentration of reactants. The molecular weight can range from as low as 500 up to about 10,000. The low molecular weight materials are light oils. The high molecular weight materials are viscous oils.

The following examples in the opinion of the inventors represent the best embodiments of their invention.

*Example 1*

Into a Magne-Dash one gallon capacity autoclave provided with means for external heating, with cooling coil for internal cooling, and a stirrer, were placed 980 g. of polyoxy-1,2-propylene glycol having an average molecular weight of about 2000 and 60 g. of di-tertiary-butyl peroxide. The contents were flushed with nitrogen to expel air from a reservoir under nitrogen pressure. To this was then added 90 g. of liquid propene-1 to a total pressure of 125 p.s.i.g. at 13° C. of nitrogen plus propylene. Ethylene gas was then introduced to a total pressure of 150 p.s.i.g. at 13° C. The contents were slowly heated to 133° C. with agitation, and maintained at 133 to 149° C. for an additional five hours.

The crude liquid telomeric product weighed 1289 g., and represented an olefin conversion of about 58%. The average molecular weight was determined to be 768, using the naphthalene eutectic method. The crude product was air-stripped of volatiles by blowing with air at 90 to 100° C., dewaxed with about one-third its weight of Fuller's earth, and then filtered to give a clear oil having a density of 0.948 g. per ml. at 24° C., and an average molecular weight of 999. The oil by carbon-hydrogen analysis analyzed 66.87% carbon, 11.287% hydrogen, corresponding to the empirical formula $C_3H_6O(CH_2)_{1.1}$. The oil had a viscosity of 518 SSU at 100° F. and 76.16 SSU at 210° F. The viscosity index was 128.5.

Twenty parts of the oil was diluted with solvent-extracted neutral lubricating oil stock 140 SSU at 100° F., producing a stable oil solution containing 16% telomer by weight. This solution was stable on standing. Upon further dilution with oil, 83% of the original dewaxed telomer remained in solution, while 17% settled out as an insoluble or less soluble fraction.

A 10.7 weight percent telomer solution in the solvent-extracted neutral oil was stable against separation of materials even at −25° C.

The telomer oil, alone or in solution in mineral lubricating oil, was useful as a lubricating oil, as a kiln lubricant, as a hydraulic fluid and as a plasticizer for synthetic polymers.

*Example 2*

Example 1 was repeated employing a polyoxy-1,2-propylene glycol having a molecular weight of 200. Similar results were obtained.

*Example 3*

Example 1 was repeated employing Ucon oil 50 HB 660, the monobutyl ether of the mixed polyoxyalkylene glycol obtained from a 1:1 ratio of ethylene oxide and 1,3-propylene oxide, having an average molecular weight of about 1700. Similar results were obtained.

*Example 4*

Into a one gallon capacity Magne-Dash autoclave were placed 980 g. of a polyoxy-1,2-propylene glycol having an average molecular weight of about 2000 and 60 g. of di-tertiary-butyl peroxide. The contents were flushed with nitrogen to remove air, and 133 g. of liquid n-butene-1 was added from a reservoir under nitrogen pressure. Then, sufficient ethylene gas was added to a total gas pressure within the autoclave of 750 p.s.i.g. at 13° C. The contents were slowly heated with stirring to 136° C., and then maintained at 136 to 150° C. for an additional seven hours. The crude product weighed 1290 g., representing an olefin conversion of about 42%, and had an experimental average molecular weight of about 830, by the naphthalene eutectic method.

The crude liquid telomeric product was stripped of volatiles in a bath with air at 90–100° C., and then dewaxed with Bentonite clay and filtered, yielding a clear oil having a density of 0.952 g. per ml. at 25° C. The oil had an average molecular weight of 1050, and its elemental analysis showed 67.11% carbon, 11.22% hydrogen, corresponding to the empirical formula

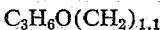

The viscosity was 665 SSU at 100° F., 94.85 SSU at 210° F., and the viscosity index was 133.

Fourteen parts of the telomer was diluted with 86 parts by weight of solvent-extracted neutral lubricating oil stock 140 SSU at 100° F. The resulting oil solution contained 10% telomer, and was stable on standing. Upon further dilution with oil, 73% of the dewaxed telomer remained in solution, while 27% settled out as an insoluble or less soluble fraction. A 9.4 weight percent solution of the telomer was stable even at −25° C.

Solubility and solvent extraction studies on the telomer showed that products containing more than 67% combined elemental carbon, i.e., a carbon to oxygen weight ratio greater than 3.08 to 1, were completely compatible with mineral oils.

The telomer oil, alone or in solution in mineral lubricating oil, was useful as a lubricating oil, as a kiln lubricant, as a hydraulic fluid and as a plasticizer for synthetic polymers.

*Example 5*

Example 4 was repeated employing a polyoxy-1,2-propylene glycol having a molecular weight at 400. Similar results were obtained.

*Example 6*

Into a Magne-Dash one gallon capacity autoclave were placed 980 g. of polyoxy-1,3-propylene glycol having an average molecular weight of about 2000, and 60 g. of di-tertiary-butyl peroxide, 510 g. of liquid propylene, and sufficient ethylene gas to produce a total initial pressure of 800 p.s.i.g. at 16° C. This mixture was reacted at 276 to 303° F. for ten hours.

The crude liquid telomeric product obtained weighed 1306 g. After stripping off the volatile material by blowing with air, a clear oil was obtained which had an average molecular weight of 833. Its viscosity at 100° F. was 510.7 SSU and at 210° F. 78.72 SSU. The viscosity index was 132.

At a 20 weight percent concentration level of the telomer in solvent-extracted neutral oil, 140 SSU at 100° F., 72% of the product was soluble. The solubility decreased upon further dilution with oil. Solvent extraction of the telomer using a 50–50 mixture of methanol and water indicated that 14.5% contained more than 67% carbon, or had a carbon-to-oxygen ratio of greater than 3.08 to 1.

The telomer oil, alone or in solution in mineral lubricating oil, was useful as a lubricating oil, as a kiln lubricant, as a hydraulic fluid and as a plasticizer for synthetic polymers.

*Example 7*

Into a one gallon capacity Magne-Dash autoclave was introduced 980 g. of polyoxy-1,2-propylene glycol having an average molecular weight of 2025, 60 g. of di-tertiary-butyl peroxide, 510 g. of liquid propylene, and sufficient ethylene gas to produce a total initial pressure at 16° C. of 800 p.s.i.g. The resulting mixture was reacted at 278 to 292° F. for four hours. 1265 g. of crude telomeric product was obtained, having an average molecular weight of 826, and a viscosity at 100° F. of 511.7 SSU and at 210° F. of 81.75 SSU. The viscosity index was 135.

This oil was slightly less oil-soluble than that of Example 6, and the oil solubility increased upon dilution with oil. 10% of the telomer was miscible with oil in all proportions.

The telomer oil, alone or in solution in mineral lubricating oil, was useful as a lubricating oil, as a kiln lubricant, as a hydraulic fluid and as a plasticizer for synthetic polymers.

*Example 8*

Into a Magne-Dash one gallon capacity autoclave was introduced 980 g. of polyoxy-1,2-propylene glycol having a molecular weight of 2025, 60 g. of di-tertiary-butyl peroxide, 180 g. liquid propylene, and sufficient gaseous ethylene to produce a total initial pressure of 840 p.s.i.g. at 13° C. The mixture was reacted at 290 to 295° F. for four hours.

The crude liquid telomeric product obtained weighed 1276 g., and had an average molecular weight of 889. Solubility in solvent-extracted neutral lubricating oil stock, 140 SSU at 100° F., was determined. It was found that 82% of the product was soluble, at a concentration level of 17 weight percent. The solubility decreased upon further dilution with oil. 6.6% of the total product was soluble in oil in all proportions.

The telomer oil, alone or in solution in mineral lubricating oil, was useful as a lubricating oil, as a fliln lubricant, as a hydraulic fluid and as a plasticizer for synthetic polymers.

*Example 9*

Example 8 was repeated employing Ucon oil LB 1145, the monobutyl ether of polyoxy-1,3-propylene glycol having a molecular weight of 3300. Similar results were obtained.

*Example 10*

Into a 500 ml. capacity Magne-Dash autoclave was introduced 140 g. of polyoxy-1,2- propylene glycol having a molecular weight of 2025, 8.6 g. of di-tertiary-butyl peroxide, 60 g. of liquid propylene, and sufficient gaseous ethylene to produce an initial total pressure of 820 p.s.i.g. at 18° C. The mixture was reacted at 270 to 332° F. for ten hours.

The crude liquid telomeric product weighed 184 g., and had an average molecular weight of 757. The viscosity at 100° F. was 535 SSU, and at 210° F. 80.7 SSU. The viscosity index was 132. About 50% of the product was soluble in solvent-extracted neutral lubricating oil stock, 140 SSU at 100° F. at a concentration level of 13.5 weight percent. The solubility decreased upon further dilution with oil. A small quantity of the total product was miscible with oil in all proportions.

The telomer oil, alone or in solution in mineral lubricating oil, was useful as a lubricating oil, as a kiln lubricant, as a hydraulic fluid and as a plasticizer for synthetic polymers.

The telomers of the invention, as the general formula shows, possess a polyhydrocarbon portion and a polyoxyalkylene compound portion. As a result, they have most attractive properties, both chemical and physical.

The polyhydrocarbon and polyoxyalkylene portions of the telomer together, according to their molecular weight and the extent of branching, control the fluidity of the telomer, which varies from a light liquid or oil through a viscous oil, all of which are free-flowing. The polyoxyalkylene unit modifies the telomer considerably, imparting to it many of the properties of the polyoxyalkylene compound. The ratio of carbon to oxygen in the telomer determines petroleum oil solubility.

When compared to a mineral lubricating oil, it has a higher temperature stability, a higher viscosity index, a higher density and a lower pour point, and the carbon residue upon pyrolysis is considerably lessened. It also has high solvent power for resins and gums as well as for sludges and varnishes. Unlike the common synthetic oil polyoxyalkylene glycols, it can have quite good solubility in petroleum hydrocarbons because of the polyhydrocarbon portion of the telomer.

The telomeric oils of the invention are useful alone or in combination with petroleum-derived fluids such as mineral lubricating oils as lubricants for internal combustion engines, high temperature lubricants in glass and ceramic manufacture, kiln lubricants, lubricants for car bearings, heat transfer fluids, hydraulic fluids, textile lubricants and other applications where low carbon residue, high lubricity and petroleum oil solubility make them quite attractive. They may be useful as radiator coolants, and in the prevention or alleviation of the effects of carburetor icing and associated phenomena when used as additives in petroleum base fuels such as gasoline. They are useful as plasticizers for synthetic resins with which they are compatible.

The telomeric glycols are themselves susceptible to many reactions, because of the presence of the hydroxyl groups.

They may, for example, be reacted with isocyanates or polyisocyanates such as toluene-2,4-di-isocyanate to produce urethane or polyurethane resins.

The following example illustrates this reaction:

*Example 11*

The telomer of Example 1 was reacted with an equal molal amount of toluene-2,4-di-isocyanate. This was accomplished by stirring into it 20% by weight of methyl morpholine as a reaction medium and promoter. The toluene-2,4-di-isocyanate was gradually poured into the mixture with stirring over a period of ten minutes. The mixture was maintained with stirring at a temperature of 100° C. for one hour, and the temperature then gradually increased over a period of one-half hour to a temperature of 150° C. during which time the methyl morpholine was removed by vaporization and the reaction product became a resinous mass. At this stage, the resinous mass was molded into a shaped product, and heated.

The polyether glycol telomers will react with organic acids (or their acid chlorides and acid anhydrides) to form monomeric and polymeric esters, depending upon whether the acid is mono- or polycarboxylic. Dicarboxylic acids form linear thermoplastic polymers, and tri- and higher polycarboxylic acids form cage type or thermosetting polymers. These esters contain two ester groups with one or more long chain telomeric units.

The oil-soluble telomers can be incorporated in any hydrocarbon lubricating stock such as a solvent-extracted or solvent-refined oil, i.e., oils treated in accordance with conventional modern methods of solvent-refining lubricating oils. The oil may be a fluid hydrocarbon lubricating base stock having a viscosity at 100° F. of 10 to 500 centistokes, such as is used as the base for SAE Nos. 10 to 50 oils. It may be obtained as a distillate such as from petroleum, or from synthetic materials, and oils produced by cracking, polymerization, dehydrogenation and the like methods are also contemplated.

The solvent-refining process is well known and generally involves a physical separation of impurities from the oil by extraction with a solvent. Usually the solvent selected such as furfural, phenol, sulfur dioxide, etc., dissolves such constituents as aromatic, unsaturated and low viscosity index materials, and these are separated. A clay treatment may follow, but while this is desirable, it is not essential. Where necessary, a separate propane or the like deasphalting treatment may be used in conjunction with the solvent-refining.

The amount of the telomer can be widely varied. Since the telomer itself is a lubricant, any proportion can be used, depending upon the proportion desired in the final product. The maximum proportion will usually be determined by the solubility of the telomer in the petroleum oil, but if the telomer oil at a certain proportion becomes a solvent for the petroleum oil, even this is not a limitation.

We claim:

A telomer prepared by the telomerization of an α-olefin taxogen selected from the group consisting of alkenes having from two to about ten carbon atoms and styrene with a polyoxyalkylene compound telogen having at least one active hydrogen atom on a carbon atom adjacent to an ether oxygen and having the formula:

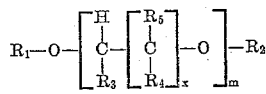

wherein $R_1$, $R_2$, $R_3$, $R_4$ and $R_5$ are selected from the group consisting of hydrogen and lower alkyl, $m$ has a value within the range from about 10 to about 5000, and $x$ has a value from one to three, at a reaction temperature within the range from about 40 to about 200° C. in the presence of a free radical initiator having a half-life at the reaction temperature within the range from about 0.25 to about 10 hours, until a free-flowing liquid telomer is obtained having a molecular weight within the range from about 500 to about 10,000.

References Cited in the file of this patent

UNITED STATES PATENTS

| | | |
|---|---|---|
| 2,782,167 | Tutwiler | Feb. 19, 1957 |
| 2,813,129 | Benoit | Nov. 12, 1957 |
| 2,842,499 | Cottle et al. | July 8, 1958 |
| 2,853,530 | Banigan | Sept. 23, 1958 |
| 2,921,920 | Smith et al. | Jan. 19, 1960 |
| 2,982,742 | Smith et al. | May 2, 1961 |

OTHER REFERENCES

Urry et al.: Jour. Amer. Chem. Soc., vol. 75 (1953), pages 250–251.

Urry et al.: Jour. Amer. Chem. Soc., vol. 76 (1954), pages 450–455.

UNITED STATES PATENT OFFICE
CERTIFICATE OF CORRECTION

Patent No. 3,137,737            June 16, 1964

Donald D. Emrick et al.

It is hereby certified that error appears in the above numbered patent requiring correction and that the said Letters Patent should read as corrected below.

Column 2, lines 62 to 65, Formula (II), the center portion of the formula should appear as shown below instead of as in the patent:

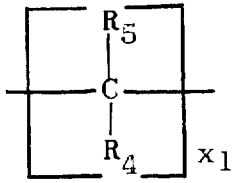

column 3, lines 35 to 38, the formula should appear as shown below instead of as in the patent:

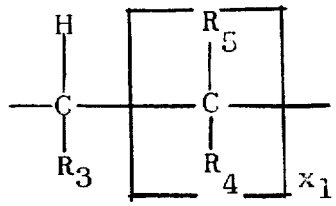

column 4, lines 6 to 10, at the upper right-hand end of the formula, the arrow should appear as shown below instead of as in the patent:

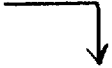

lines 24 and 25, for "oxyalklene" read -- oxyalkylene --; column 9, line 17, for "at" read -- of --; column 10, line 8, for "fliln" read -- kiln --.

Signed and sealed this 22nd day of December 1964.

(SEAL)
Attest:

ERNEST W. SWIDER            EDWARD J. BRENNER
Attesting Officer            Commissioner of Patents